Dec. 17, 1946.                P. TRAUGOTT                2,412,639
                            ELECTROCARDIOGRAPH
                           Filed June 2, 1944           2 Sheets-Sheet 1
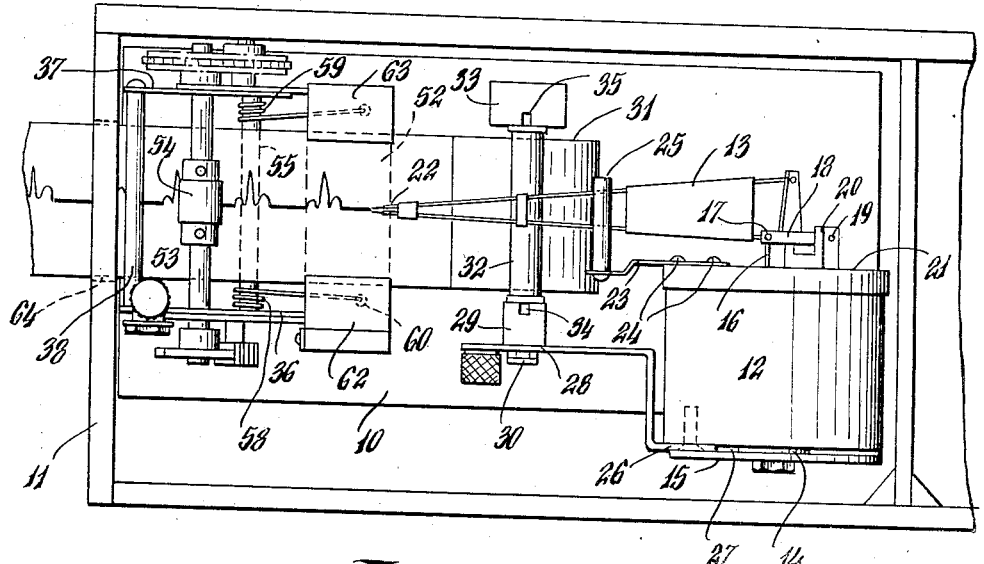
Fig. 1.
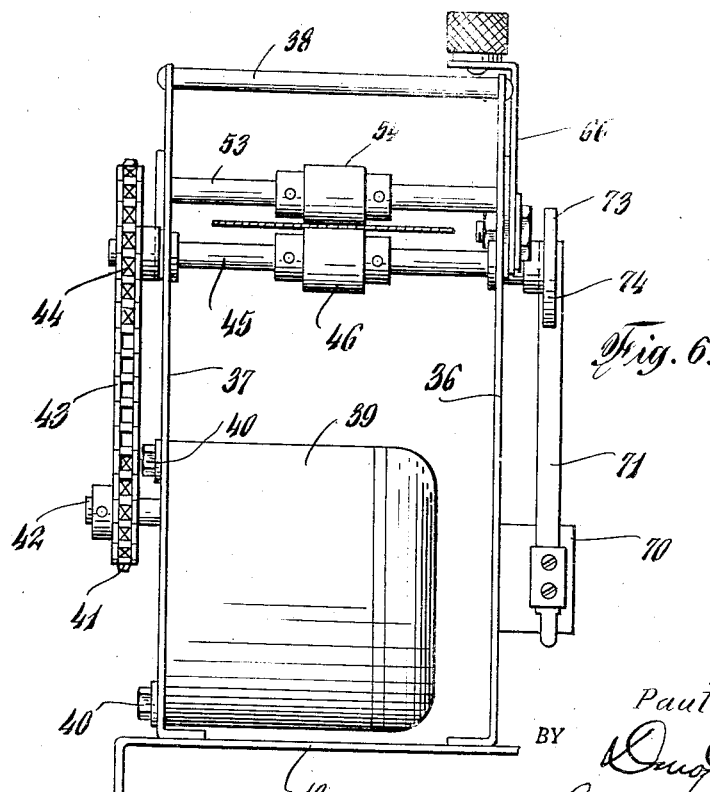
Fig. 6.
INVENTOR.
Paul Traugott
BY
ATTORNEY

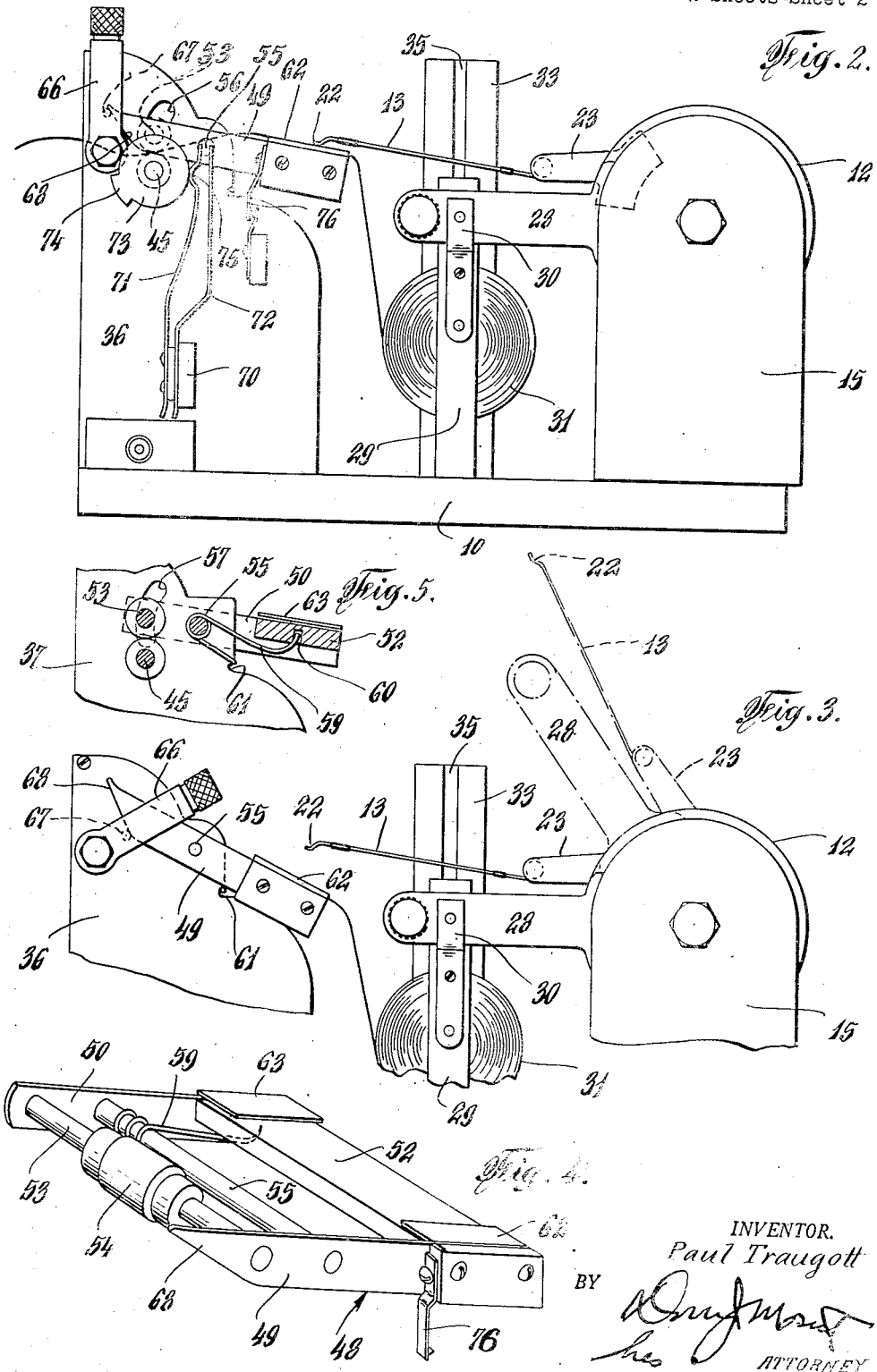

Patented Dec. 17, 1946

2,412,639

UNITED STATES PATENT OFFICE 2,412,639

ELECTROCARDIOGRAPH

Paul Traugott, New York, N. Y., assignor to Electro-Physical Laboratories, Inc., New York, N. Y., a corporation of New York Application June 2, 1944, Serial No. 538,479

5 Claims. (Cl. 234—70)

This invention relates to electro-cardiographs wherein instantaneous direct electro-cardiograms are produced by a stylus on a moving chart, of the type disclosed in my co-pending application Serial No. 537,175, filed May 24, 1944, of which the present application is a continuation in part, the invention being specifically directed to improvements in the mechanical means associated with the electrical elements of such apparatus.

It is an object of the invention to provide a mechanical structure for electro-cardiographs of the aforementioned character embodying means whereby the writing stylus, while normally maintained in an operative position in contact with the chart, is readily displaceable to an inoperative position whenever desired, as for instance to effect removal of the chart carriage and substitution of the chart roll, and, conversely, the chart is displaceable relative to the stylus while this latter is maintained in its operative position, to separate the chart from the stylus and concurrently arrest feeding thereof, so as to render the electro-cardiograph inoperative without in any way affecting the electrically functioning elements of the apparatus.

It is a further object of the invention to provide a galvanometer-stylus unit which is pivotally mounted on a stationary element of the mechanical structure of the apparatus so as to permit of readily displacing the stylus from its normal operative position, as aforesaid.

It is another object of the invention to provide a frame incorporating a writing table which supports the chart and, in the normal position of the frame, maintains the moving chart in contact with the stylus, the frame being however mounted for angular movement to permit displacement of the table and chart carried thereby out of contact with the stylus.

Still another object of the invention is to provide means associated with the aforementioned frame and adapted to maintain the chart in engagement with a chart driving element, to insure feeding of the chart, said means being automatically moved in the angular displacement of the frame, out of cooperative association with the chart driving element to render this latter ineffective, thereby interrupting the feeding of the chart without acting on the electrically functioning elements of the apparatus.

These and other objects will become apparent in the following description of the invention illustrated in the drawings, wherein:

Fig. 1 is a plan view of the electro-cardiograph showing the mechanical structure thereof according to the invention.

Fig. 2 is a side elevation of the apparatus illustrating the various elements of the mechanical structure in their normal or operative position.

Fig. 3 is a similar side elevation of the apparatus, with parts of the structure removed, illustrating the displacement of the frame and the galvanometer-stylus unit relative to one another when moved to their respective inoperative positions.

Fig. 4 is an enlarged perspective view of the frame incorporating the writing table and elements associated therewith.

Fig. 5 is a fragmentary view, partly in section, of the frame, illustrating the means for maintaining the table in its normal position.

Fig. 6 is an end elevation showing the chart driving mechanism.

Referring now in detail to the drawings, it will be seen that all of the mechanical elements of the electro-cardiograph are assembled on a base 10 mounted in the casing 11, which is conformed for housing in separate compartments the electrically functioning elements of the apparatus, not shown since they do not constitute part of the present invention.

As will be observed from Figs. 1 and 2, the aforementioned mechanical elements form the following three operatively associated units: the galvanometer-stylus assembly shown at the right in the figures, the chart carriage shown in the center, and the writing table and chart driving assembly shown at the left.

The galvanometer-stylus assembly comprises a cylindrical casing 12 enclosing suitable means for actuating the stylus 13, that include specific electrical elements such as disclosed in my aforementioned co-pending application, the assembly being pivotally mounted, as at 14, on a vertical wall 15 extending upwardly from the base 10. For the purpose of the present disclosure, it will be sufficient to mention that the aforesaid means are effective to reciprocate a stylus drive pin 16 axially extending from the casing 12, said pin being rigidly and insulatingly secured, as at 17, to the drive end 18 of the longitudinally extending stylus 13 which carries a vertically extending pin 19 pivotally mounted in a bearing 20 fastened to the face 21 of the casing 12. As will be apparent, by virtue of this construction the reciprocation of the drive pin 16 induced by the actuating means contained in the casing 12 is translated into an oscillation of the stylus 13, which, due to the comparatively great length of the stylus, results in a considerable displacement of the opposite free end or point 22 of the stylus transversely of the chart and therefore in the delineation of relatively large and readily legible cardiograms through the action of the suitably heated stylus point on the waxed chart paper.

A bracket 23 suitably mounted on the face 21 of the casing 12, as at 24, extends in the direction of the free end of the stylus, and carries a bar 25, made of insulating material such as rubber, which extends transversely of the stylus, said bar being so positioned as to exert a positive but relatively light pressure on the stylus sufficient to maintain the free end thereof in contact with the chart during operation of the apparatus as shown in Figs. 1 and 2, to insure production of the cardiograms, without however generating such a friction that might disturb the oscillation of the stylus transversely of the chart or restrain the movement of the latter effected in the manner that will be hereafter described.

A lever 26 secured to the outer face 27 of the casing 12 and radially extending therefrom is bent at right angles to form an end portion 28 which is of flat conformation and is locked to an upright 29, fixed to the base 10, by means of a leaf spring 30 suitably fastened to said upright, the lever 26 and the spring 30 being so arranged as to normally maintain the casing 12 and associated elements in the operative position shown in Figs. 1 and 2 wherein the free end of the stylus is in contact with the chart. By disengaging the end portion 28 of the lever 26 from its associated spring 30, the assembly may be angularly displaced to move the stylus to the inoperative position shown in dotted lines in Fig. 3.

A chart roll 31 is rotatably and removably supported in a carriage 32, which is mounted between the aforementioned upright 29 and a second vertical upright 33, similarly secured to the base 10, and embodies portions adapted to slidably engage the vertical grooves 34 and 35 formed on the inner face of the uprights, whereby the carriage may be removed from its mounting uprights whenever desired, as for instance for changing the chart roll. The chart is fed from the roll 31 to the feed rollers associated with the driving mechanism that will be hereafter described.

The remaining elements of the mechanical structure of the apparatus including the chart driving means and the writing table are mounted on the parallel spaced walls 36 and 37 which extend upwardly from the base 10 at the left end of the assembly and are connected at their upper ends by the bracing bar 38.

A motor 39 is fastened to the wall 37 as by means of bolts 40; a sprocket wheel 41 fast on drive shaft 42 of the motor rotates by means of a chain 43 sprocket wheel 44 mounted at one end of a horizontal shaft 45 journalled between the walls 36, 37, and carrying a feed roller 46 (see Fig. 6). A frame 48 (Fig. 4) comprising parallel legs 49, 50 is provided at one end thereof with a rectangular block 52 forming a table adapted to support the chart and defining at its upper flat face a writing surface for the stylus.

At the opposite end of the frame, there is journalled between the legs 49, 50 a shaft 53 carrying a driven feed roller 54 adapted to cooperate with feed roller 46, the frame being provided, intermediate the ends of the legs, with a mounting rod 55 the ends whereof are journalled in the walls 36, 37 to permit angular movement of the frame and therefore of the associated writing table 52 and feed roller 54. The ends of the shaft 53 carrying the feed roller 54 extend into arcuate slots 56, 57 formed in the walls 36, 37, to limit the angular movement of the frame to the amount required for proper operation of the apparatus.

The frame 48 is maintained in a predetermined normal angular position, or operative position, wherein the writing table is disposed in parallelism with the stylus 13 and the chart supported by the table is in contact with the free end 22 of the stylus, by means of a pair of tension springs 58, 59 mounted adjacent the ends of the rod 55, one of the free ends of each spring being locked in a groove 60 provided in the undersurface of the table 52 and the other free end of the springs being locked at a notch 61 in each of the walls 36, 37. The springs are so tensioned as to maintain the frame in the aforementioned normal position, in which also the driven feed roller 54 is located in close proximity to the driver feed roller 46. The chart paper is fed from the roll 31 across the writing surface of the table 52 through the guide plates 62, 63 provided at the ends thereof, and thence between the feed rollers 46, 54 which are made of resilient material to produce sufficient frictional contact with the chart paper so as to continuously draw the same in one direction, as the feed roller 46 is rotated in the movement of its shaft 45 brought about by the motor 39 through the aforementioned sprocket and chain connection. The free end of the chart passes from the feed rollers through the slot 64 in the apparatus casing 11.

The apparatus also comprises means for displacing the chart from contact with the stylus point whenever desired for making adjustments in the mechanical or electrical elements of the apparatus, or for any other purposes, while maintaining the stylus in its normal operative position. To this end, the following mechanism is provided. A lever 66 carrying a cam follower 67 is pivotally mounted at one end thereof on wall 36 of the apparatus adjacent the end of the leg 49 of the frame 48, which end is formed with a cam surface 68. In the angular movement of the lever 66, the cam follower thereof engages and traverses the cam surface 68, thereby causing the frame to rotate about its mounting rod 55 against the tension of the springs 58, 59 and to be angularly displaced to the position shown in Fig. 3 in which position the chart supported by the table 52 is displaced below and out of contact with the stylus point 22 and the driven feed roller 54 is moved out of cooperative association with the driver feed roller 46, whereby the feeding of the chart is concurrently automatically interrupted. As will be apparent, upon reversing the movement of the lever 66, the tension springs 58, 59 return the writing table 52 and the feed roller 54 to their respective operative positions.

Mounted on the outer face of the wall 36 is a normally open switch 70 having spaced flexible contact blades 71, 72 that extend upwardly to a point in the neighborhood of the frame leg 49. A cam 73, mounted on the shaft 45 for continuous rotation therewith, is provided with a hump 74 which, in the rotation of the cam, periodically engages the offset portion 75 of the flexible blade 71 and displaces the latter into contact with its associated blade 72, thereby closing the switch. This operation of the switch 70 is effective to periodically introduce a source of standardizing potential into the circuit, as disclosed in my aforementioned co-pending application, only however when the switch contact 76 is closed by the maintenance of the frame 48 in its operative position.

It will be understood that while the invention has been described in detail substantially with reference to a specific type of electro-cardiograph employing certain electrical elements, the invention may find application in connection with apparatus wherein different electrical elements are used, and that changes and modifications may be made in the structure described and illustrated in the drawings without departing from the spirit of the invention or exceeding the scope of the claims.

I claim:

1. In an electro-cardiograph comprising a stylus adapted to produce cardiograms upon a moving chart; a frame mounted for angular movement in a vertical plane and embodying a table for supporting the chart, resilient means for normally maintaining said frame in an operative position wherein the chart is in contact with the stylus, means effective in said operative position of the frame to continuously feed the chart across said chart supporting table, a cam surface formed on the frame, and a pivoted lever having a portion adapted to act on said cam surface to angularly displace the frame from said operative position thereof in opposition to said resilient means to move the chart supported by the frame table out of contact with the stylus, the aforesaid chart feeding means becoming ineffective in the angular displacement of the frame from the operative position thereof.

2. In an electro-cardiograph comprising a stylus adapted to produce cardiograms upon a moving chart; a frame mounted for angular movement in a vertical plane and embodying a table for supporting the chart, means for normally maintaining said frame in an operative position wherein the chart is in contact with the stylus, a drive roller, a roller associated with the frame and adapted, in said operative position of this latter, to maintain the chart in engagement with said drive roller to insure feeding of the chart, a cam surface formed on said frame, and means operable to engage said cam surface to angularly displace the frame from said operative position thereof to move the chart supported by the table out of contact with the stylus and simultaneously displace said roller associated with the frame, thereby releasing the chart from engagement with the drive roller to interrupt feeding of the chart.

3. In an electro-cardiograph comprising a stylus adapted to produce cardiograms upon a moving chart; a pair of fixed supports, a frame rotatably mounted on said supports intermediate the ends thereof, a table carried at one end of said frame for supporting the chart, spring means for normally holding the frame in an operative position wherein the table supported chart is maintained in contact with the stylus, a drive roller mounted in said supports, a second roller mounted on the end of the frame opposite the table and effective in the operative position of the frame to maintain the chart in frictional engagement with said drive roller to insure feeding of the chart across the table, and means operable to angularly displace said frame from said operative position thereof, to move the table supported chart out of contact with the stylus and simultaneously displace said second roller, thereby releasing the chart from frictional engagement with said drive roller to interrupt feeding of the chart.

4. In an electro-cardiograph comprising a stylus adapted to produce cardiograms upon a moving chart; a pair of fixed supports, a frame rotatably mounted on said supports intermediate the ends thereof, a table carried at one end of said frame for supporting the chart, spring means for normally holding the frame in an operative position wherein the table supported chart is maintained in contact with the stylus, a drive roller mounted in said supports, a second roller mounted on the end of the frame opposite the table and effective in the operative position of the frame to maintain the chart in frictional engagement with said drive roller to insure feeding of the chart across the table, a cam surface formed adjacent one end of the frame, and means associated with one of said supports operable to engage said cam surface to angularly displace the frame from said operative position thereof in opposition to the spring means aforesaid, to move the table supported chart out of contact with the stylus and simultaneously displace said second roller, thereby releasing the chart from frictional engagement with said drive roller to interrupt feeding of the chart.

5. In an electrocardiograph comprising a stylus adapted to produce cardiograms on a chart; a pair of fixed supports, a frame pivotally mounted on said supports having an end portion conformed to support the chart, resilient means for maintaining said frame in a predetermined normal angular position wherein the chart is in contact with the stylus, a cam surface formed on said frame, and means carried by one of said supports movable into engagement with said cam surface to angularly displace the frame from said normal position thereof in opposition to said resilient means to move the chart supported by the frame out of contact with the stylus.

PAUL TRAUGOTT.